United States Patent [19]

Blankenship

[11] Patent Number: 5,105,061
[45] Date of Patent: Apr. 14, 1992

[54] VENTED ELECTRODE FOR A PLASMA TORCH

[75] Inventor: George D. Blankenship, Chardon, Ohio

[73] Assignee: The Lincoln Electric Company, Cleveland, Ohio

[21] Appl. No.: 655,984

[22] Filed: Feb. 15, 1991

[51] Int. Cl.$^5$ .............................................. B23K 9/00
[52] U.S. Cl. .............................. 219/121.520; 219/119; 219/121.48; 219/121.51
[58] Field of Search ........... 219/121.52, 121.5, 121.51, 219/75, 121.48, 119

[56] References Cited

U.S. PATENT DOCUMENTS

| | | | |
|---|---|---|---|
| 3,450,926 | 6/1969 | Kiernan | 313/231.31 |
| 3,944,778 | 3/1976 | Bykhovsky et al. | 219/121.52 |
| 4,558,201 | 12/1985 | Hatch | 219/121.52 |
| 4,581,516 | 4/1986 | Hatch et al. | 219/121.5 |
| 4,590,354 | 5/1986 | Marhic et al. | 219/121.52 |
| 4,656,330 | 4/1987 | Poole | 219/121.52 |
| 4,691,094 | 9/1987 | Hatch et al. | 219/121.5 |
| 4,748,312 | 5/1988 | Hatch et al. | 219/121.52 |
| 4,769,524 | 9/1988 | Hardwick | 219/121.52 |
| 4,782,210 | 11/1988 | Nelson et al. | 219/121.52 |
| 4,864,097 | 9/1989 | Wallner | 219/121.5 |
| 4,959,520 | 9/1990 | Okada et al. | 219/121.48 |
| 4,967,055 | 10/1990 | Raney et al. | 219/121.5 |

*Primary Examiner*—Mark H. Paschall
*Attorney, Agent, or Firm*—Body, Vickers & Daniels

[57] ABSTRACT

A plasma torch having an electrode with an insert disposed in an insert bore at one end and includes a vent to prevent high pressure cutting oil vapor generated by evaporation of cutting oil trapped in the cavity between the insert and the insert bore. The vent is a groove formed between the cavity and the outer surface of the electrode from pushing the insert out of the insert bore.

25 Claims, 3 Drawing Sheets

VENTED ELECTRODE FOR A PLASMA TORCH

The present invention relates to a vented electrode for a plasma torch. The invention is particularly applicable for use with an electrode of a plasma torch to vent cutting oil vapor trapped between an insert bore extending from one end of the electrode and an insert disposed in and closing off the insert bore and will be described with reference thereto; however, the invention has much broader applications and may be used in other systems where venting the cavity between inserts and insert bores of electrodes is required.

BACKGROUND OF THE INVENTION

Plasma arc torches are commonly used for cutting, welding and spray bonding of workpieces and are operated by directing a plasma consisting of ionized gas particles toward a workpiece. In the operation of a typical plasma arc torch, a gas to be ionized is supplied to the front end of the plasma arc torch and channeled between a pair of electrodes before exiting through an orifice in the torch tip. One electrode, which is at a relatively negative potential, is usually referred to as the "cathode" or simply as the "electrode". The torch nozzle, which is adjacent to the end of the "electrode" at the front end of the torch, constitutes the relatively positive potential electrode or "anode".

When a sufficiently high voltage is applied, an arc is caused to jump the gap between the electrode and the torch housing, thereby heating passing gas around the electrode and between the electrode and housing and causing it to ionize. A pilot, pulsating voltage between the electrode and the housing starts the plasma arc. The ionized gas flows out of the torch and appears as an arc that extends externally from the outlet in the torch nozzle. In the normal transferred arc operation, the workpiece serves as the anode. This operation is initiated by the torch head being moved close to the workpiece so the arc jumps or transfers between the electrode and the workpiece.

In conventional torches, the charged electrode is typically made of copper with a tungsten electrode insert and current flows between the tungsten insert and the torch tip or workpiece when the torch is operated. Tungsten is oxidized easily at high temperatures so that if the gas to be ionized is air, the tungsten insert becomes oxidized and is rapidly consumed, thus necessitating frequent replacement. The gas to be used for creating the plasma is typically an inert gas, such as nitrogen or argon, in order to reduce oxidation and thereby prolong electrode life. Where air is used, materials resistant to oxidation such as hafnium or zirconium have been used as the electrode insert material. Examples of inserts in insert bores of electrode members are illustrated in U.S. Pat. Nos. 4,581,516; 4,691,094 and 4,959,520.

Typically, the insert is disposed in a closed insert bore machined into one end of the electrode body. The machining of the insert bore is accomplished in a time efficient and therefore cost effective manner by bathing the bore producing machinery with a constant stream of cutting oil. The problem which the present invention solves is caused by the cutting oil from the machining process remaining in the insert bore and being evaporated into a high pressure vapor trapped between the insert and the bore. More specifically, cutting oil is trapped in the cavity formed between the closed end of the insert bore and the end of the insert facing and in space relation thereto.

When the electrode is heated as the arc is established from the electrode, the pressure of the vapor generated by the evaporation off of the cutting oil in the cavity between the closed end of the insert bore and the facing end of the insert can be sufficient to push or move the insert at least partially out of the electrode body, typically in the first few seconds of operation.

A minimum force of about 17 pounds and a maximum force of about 85 pounds have proven sufficient to push an insert out of an insert bore. Based on a cylindrical insert having a 0.06 inch diameter and an area of 0.00283 square inches, this translates to a minimum pressure of 6,012 pounds per square inch (psi) and a maximum pressure of 35,714 psi. Since the operating temperature of an electrode body at the end containing the insert is between about 400° centigrade (C) and 600° C., a petroleum based cutting oil, which will certainly boil at even lower temperatures, will form a vapor. This oil based vapor can reach a considerable pressure of about 6,000 psi or more and thereby force the insert out of the electrode insert bore.

To overcome this problem, a number of possible solutions were considered but ultimately rejected for financial or operational considerations.

One solution involves eliminating the use of cutting oil in machining the insert bore into the electrode body. However, conventional machinery which accurately and expeditiously bores the electrode member requires a constant shower of oil to insure the integrity of the bearing life and, therefor, its accuracy. Although the manufacturing can be accomplished without oil, the process takes longer and is therefore more expensive.

A second solution to the problem is to extend and connect the insert bore to an inlet cavity extending from the other end of the electrode body so that the oil can drain therein. Examples of this configuration are disclosed in U.S. Pat. Nos. 3,450,926; 4,590,354; 4,864,097 and 4,967,055. However, the reduction in the mass of the electrode body significantly reduces the mass required for adequate heat transfer and therefore the operational life of the electrode will be shortened.

A third solution is to provide a narrow connection passage from the insert bore to the inlet cavity, such as disclosed in U.S. Pat. No. 4,748,312, whereby the trapped oil can escape. This solution would substantially eliminate the heat transfer problem but leaves a deep, narrow channel in which trapped oil and plating residue can collect. Clearing and probably baking operations would then be required to carefully clear this channel. Otherwise, any remaining debris would be free to migrate back into the torch body and potentially cause electrical tracking or clog the plasma gas swirl holes.

SUMMARY OF THE INVENTION

The present invention is specifically directed to an electrode for a plasma torch including an electrode member having a closed ended insert bore extending from one end of the electrode member and an insert disposed in the insert bore. A vent from a cavity defined by the closed end of the insert bore and the insert to the one end of the electrode member is specifically provided for expelling high pressure vapor generated by the evaporation of cutting oil trapped in the cavity to prevent the insert from being pushed or moved at least partially out of the insert bore when the electrode is heated.

The vent is a channel formed between the insert and the insert bore for venting the cavity therebetween to allow for the escape of trapped oil vapor. The channel is a groove extending at least the length of the insert. Preferably, the groove has a substantially triangular cross-sectional configuration although other shapes are considered within the terms of the invention.

In accordance with a preferred embodiment of the invention, the insert has a substantially cylindrical outer peripheral surface and the insert bore has a substantially cylindrical inner peripheral surface receiving the insert with a surface-to-surface, telescoping fit. The groove extends into the insert from the outer peripheral surface to provide an escape passageway for cutting oil vapor trapped in a cavity defined by the closed end of the insert bore and an end face of the insert.

In accordance with an alternative embodiment of the invention, the groove extends into the substantially cylindrical inner, peripheral surface of the insert bore to provide an escape passageway for cutting oil vapor trapped in the cavity defined by the closed end of the insert bore and the end face of the insert. The alternative embodiment is particularly advantageous in that the groove can be economically machined into the insert bore at the same time the insert bore is formed.

The primary object of the present invention is to provide an improved electrode for a plasma torch wherein high pressure cutting oil vapor generated by evaporation of the cutting oil and trapped between an insert bore and an insert closing the insert bore is vented to prevent the insert from being pushed or moved at least partially out of the insert bore.

Another object of the present invention is to provide an improved electrode for a plasma torch wherein trapped cutting oil vapor is vented while at the same time avoiding migration of the vapor or other residue into the torch body.

It is a further object of the present invention to provide an improved electrode for a plasma torch wherein trapped cutting oil vapor is vented while at the same time maintaining the desired heat transfer from the end of the electrode having the insert to the remainder of the electrode body.

It is a still further object of the present invention to provide an improved electrode for a plasma torch wherein trapped cutting oil vapor is vented through a groove which is relatively inexpensive to provide.

These and other objects and advantages will become apparent from the following description, taken together with the accompanying drawings.

PREFERRED EMBODIMENT

Figure 1:
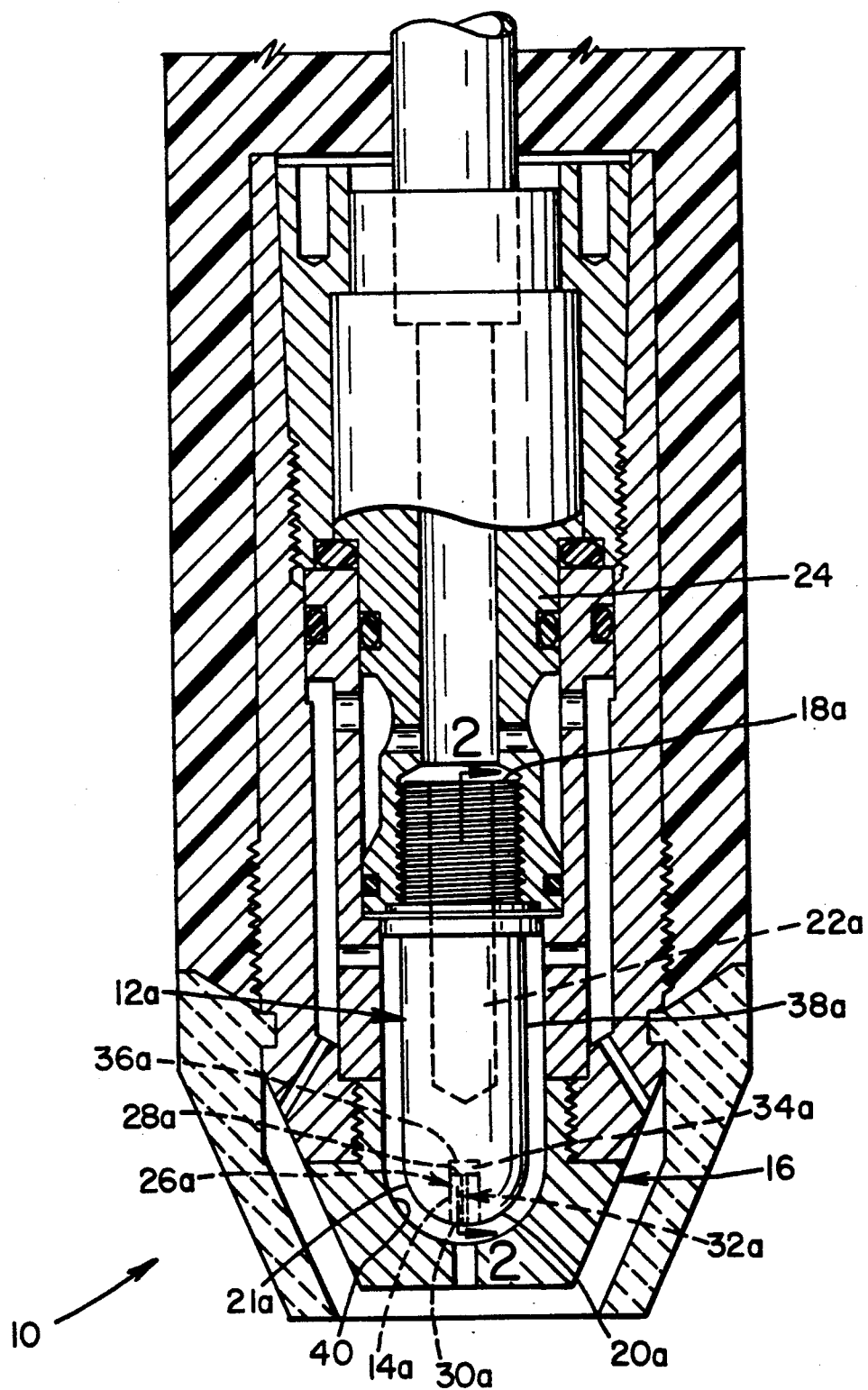
FIG. 1 is a plasma torch body, partly in section, incorporating a vented insert bore at one end of the electrode in accordance with the present invention.

Referring now to the drawings wherein the showings are for the purpose of illustrating the preferred embodiments of the invention only and not for the purpose of limiting said invention, FIGS. 1, 2, 4, and 5 show a plasma torch 10 in section having an electrode 12a with an insert bore 14a at one end. The electrode is disposed in a hollow nozzle 16. The electrode 12a has first and second opposite ends 18a and 20a, respectively, an outer surface 21a and a closed axial passage 22a extending from the first end 18a. The first end 18 is threaded and threadedly received in an electrode support 24. The second end 20 of the electrode includes the insert bore 14a with an insert 26a therein and vent structure 32a therebetween. The insert has a generally cylindrical peripheral outer surface and substantially parallel, circular end surfaces 28a and 30a. The vent structure 32a is provided from the cavity 34a formed between the end surface 30a of the insert and the closed end surface 36a of the insert bore to the outer surface of the electrode. Electrodes having an axial bore extending from one end and an insert bore with an insert therein disposed from the other end of the electrode are known in the art as illustrated in FIG. 3, wherein like parts are shown without the suffix letter a. However, as explained hereinbefore, the insert bore 14 often contains cutting oil which remains from the machine cutting of the bore during the manufacturing thereof. In particular, the cutting oil collects and is trapped in the cavity 34 between insert 26 and the closed end 36 of the insert bore 14. When the plasma forming gas flowing through the chamber defined by the outer surface 38 of electrode 12 and the inner surface 40 of the nozzle 16 heats up from contact with the electric discharge between the electrode and the nozzle, the oil trapped in cavity 34 is heated and evaporated into a gas vapor. The resulting high pressure vapor trapped in cavity 34 can push or move the insert 26 at least partially out of the insert bore 14.

Figure 2:
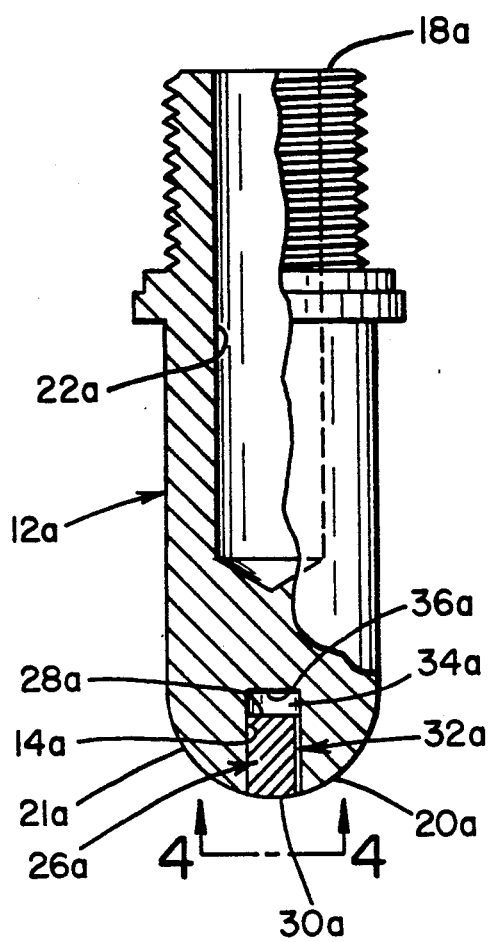
FIG. 2 is an enlarged view of an electrode in section, take along line 2—2 in FIG. 1, incorporating a vented insert in accordance with a first embodiment of the invention.
Figure 3:
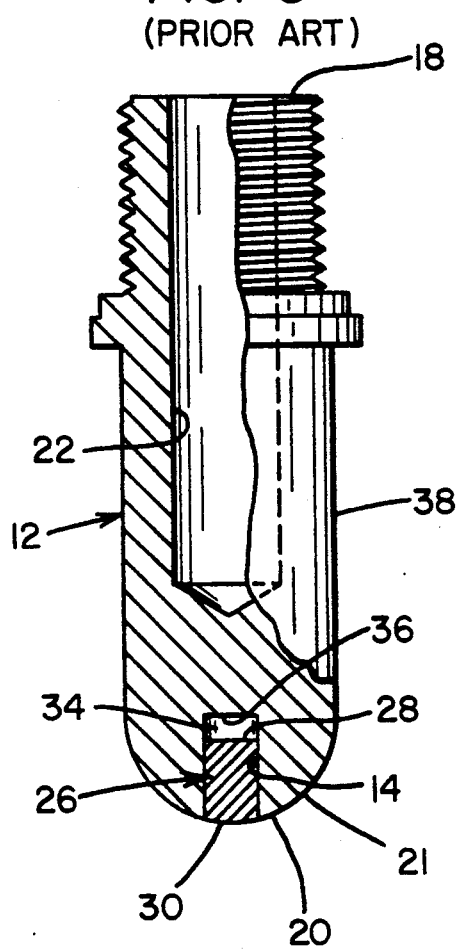
FIG. 3 is a prior art electrode in section having an insert disposed in an insert bore.
Figure 4:
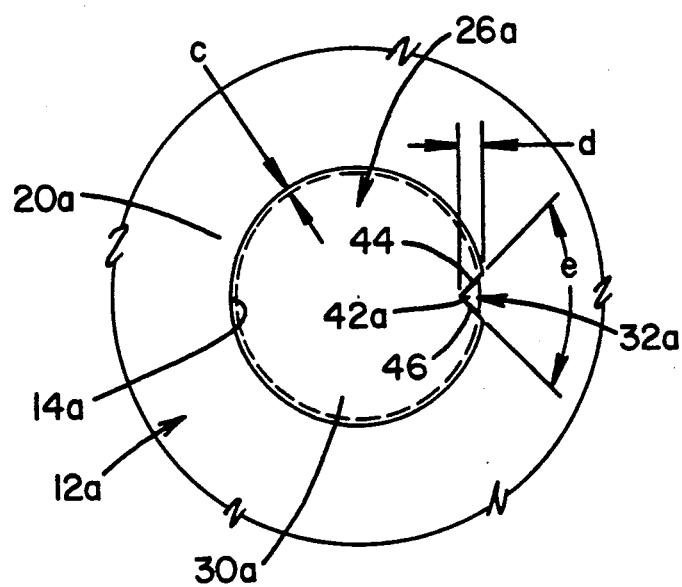
FIG. 4 is an enlarged view through line 4—4 of FIG. 2.
Figure 5:
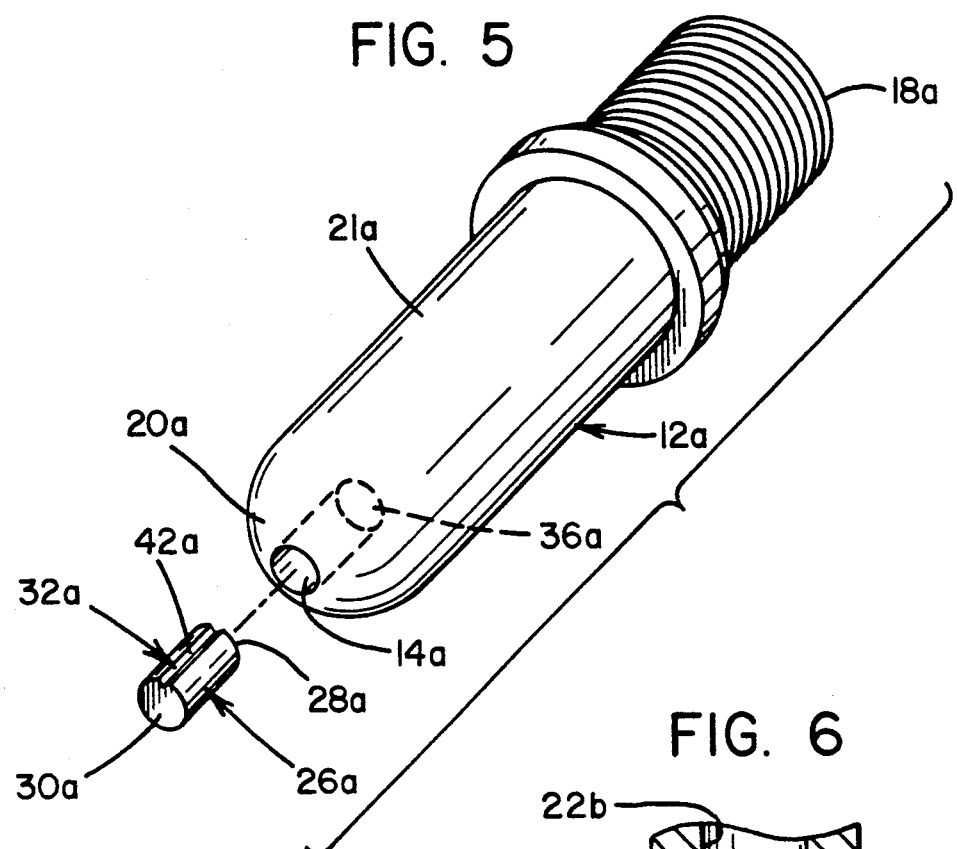
FIG. 5 is a perspective, assembly view with an insert bore at one end of an electrode and an insert having a vent disposed therein in accordance with a first embodiment of the invention.

To overcome this problem, a preferred novel construction, as generally illustrated in FIG. 1 and specifically illustrated in FIGS. 2, 4 and 5, is provided.

A preferred embodiment, as illustrated in FIGS. 2, 4 and 5 includes an insert 26a in an insert bore 14a and structure providing a vent passageway 32a therebetween.

Generally, as illustrated in FIGS. 2 and 4, the elongated electrode 12a has a circular cross-section and an insert bore 14a having a substantially cylindrical inner peripheral surface at the second end 20a. The insert 26a is generally constructed with a cylindrical outer surface having parallel end surfaces 28a and 30a at opposite ends. The insert includes a vent structure 32a comprising a groove 42a which extends the length of the insert and into the cylindrical outer peripheral surface thereof. The groove preferably has a triangular cross-sectional configuration as illustrated in FIG. 4. Since the triangular groove 42a extends between the end surfaces 28a and 30a, it enables trapped oil gas and/or liquid in cavity 34a to escape.

An important consideration in designing groove 42a is the difference between the thermal expansion of the insert material, typically hafnium (569 u inch/inch °kelvin), and that of the electrode material, typically copper (16 u inch/inch °kelvin). At normal torch operating temperatures, when the end of the electrode has an operating temperature in the range of about 400° to about 600° C., there is a resulting interference fit of about 0.0018 inches between the insert and the electrode, provided that a generally surface-to-surface fit existed at ambient temperature, as seen in FIG. 4. Although a slight interference fit is most desirable for assembly of the insert into the bore, in practice, a sliding surface-to-surface fit is provided. If the insert were too small, it could easily fall out of the insert bore whereas if it were too large, i.e. having a significant interference fit, it would be difficult to assemble the insert into the insert bore. Based on the existence of an interference fit at operating temperatures, it is important that the groove be sufficiently large that it is not closed during torch operation. Therefore, normal surface defects along the longitudinally extending outer peripheral surface of the insert or along the inner peripheral surface of insert bore 14a are insufficient, because of the interference fit, to provide the venting in accordance with the disclosed invention.

Referring specifically to FIG. 4, the surface-to-surface fit of an exemplary insert 26a in a bore 14a of an electrode 12a is illustrated. The outer diameter of insert 12a and the inner diameter of insert bore 14a each have a normal diameter of about 0.055 inches and a spacing "c" of about 0.007 inches therebetween. The groove 42 has a depth "d" of about 0.005 inches and has intersecting walls 44 and 46 disposed at an angle "e" of about 90°. These dimensions and the configuration have proven operative to provide the vent 32a at operating temperatures, however, other dimensions and configurations can be used for constructing a groove to vent the high pressure trapped oil vapor. Further, since only about 5% of the outer surface area of insert 26a is spaced from and not contacting the surface of insert bore 14a, the heat transfer characteristics between the insert and the electrode is not significantly effected.

Although the groove 42a is illustrated with a triangular cross-sectional configuration, it is within the terms of the invention to use other cross-sectional configurations such as semi-circular or rectangular. The primary limitations are that the vent structure 32a enables the oil vapor to escape from cavity 34a at the torch operating temperatures.

Figure 6:
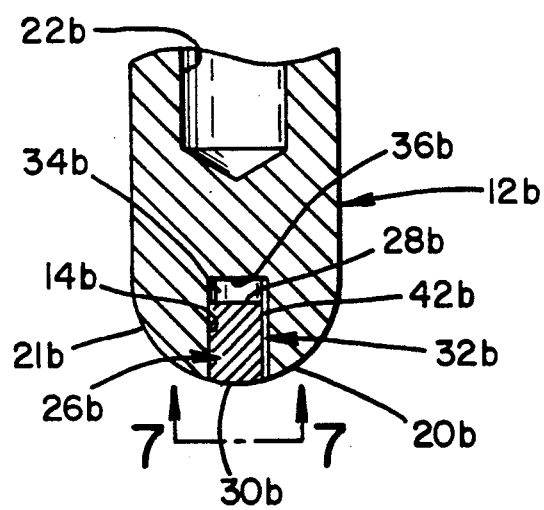
FIG. 6 is an enlarged view of a portion of an electrode in section, of the type illustrated in FIG. 1, incorporating a vented insert bore, in accordance with a second embodiment of the invention.
Figure 7:
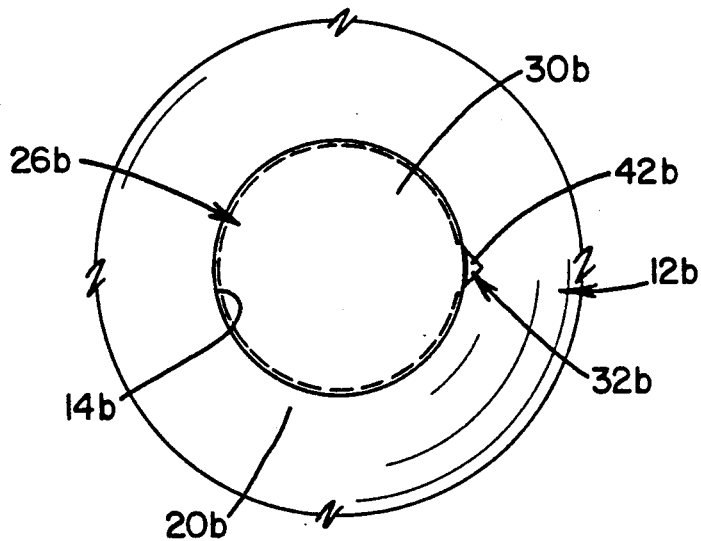
FIG. 7 is an enlarged view through line 7—7 of FIG. 6.

Referring to FIGS. 6 and 7, there is illustrated a second embodiment of the present invention wherein an electrode 12b having an insert bore 14b with an insert 26b disposed therein provides a vent structure 32b in the inner peripheral surface of the insert bore itself. That is, the groove 42b extends along the inner surface of insert bore 14b from the outer surface 21b of the second end 20b to the closed end surface 36b. The groove 42b provides an escape path for cutting oil vapor which is trapped in the cavity 34b.

Although the present invention has been described as including an electrode of copper and an insert of hafnium, it is within the scope of the invention to construct the electrode of other desired conductive material such as copper alloy and the insert of other desired materials besides hafnium such as tungsten, zirconium and alloys thereof.

The invention has been described with reference to preferred embodiments and it is apparent that many modifications can be incorporated into the designs and configurations of the vented insert bores for plasma torches disclosed herein without departing from the sphere or essence of the invention. It is intended to include all such modifications and alterations insofar as they come within the scope of the present invention.

Having thus defined the invention, it is claimed:

1. In an electrode adapted for a plasma torch including an elongated electrode member having an outer surface and first and second opposite ends, said electrode member having an insert bore being closed at one end and extending into the electrode member from the second end, an insert disposed in said insert bore being spaced from the closed end of the bore to form a cavity therebetween, the improvement comprising:
   means extending between said outer surface of the electrode and said cavity for venting said cavity whereby vapor from substances trapped in said cavity do not build up so as to at least partially push said insert out of said insert bore.

2. An electrode as defined in claim 1 wherein said insert is selected of a material having a higher coefficient of thermal expansion than that of the material forming the electrode member whereby said insert is received within said insert bore with a surface-to-surface fit at ambient temperature and with an interference fit when the electrode is at operating temperatures.

3. An electrode as defined in claim 2 wherein said electrode member is constructed of an electrically conductive material selected from the group comprising copper and copper alloys.

4. An electrode as defined in claim 3 wherein said insert is constructed of a metal being capable of withstanding high operating temperatures, said insert selected from the group comprising hafnium, zirconium, tungsten and alloys thereof.

5. In an electrode adapted for a plasma torch including an elongated electrode member having an outer surface and first and second opposite ends, said electrode member having an insert bore being closed at one end and extending into the electrode member from the second end, an insert disposed in said insert bore being spaced from the closed end of the bore to form a cavity therebetween, the improvement comprising:
   means extending between said outer surface of the electrode and said cavity for venting said cavity whereby vapor from substances trapped in said cavity do not build up so as to at least partially push said insert out of said insert bore, said vent means comprising a groove between said insert bore and said insert for venting vapor of oil trapped in said cavity.

6. An electrode as defined in claim 5 wherein:
   said insert has a substantially cylindrical outer peripheral surface;
   said insert bore has a substantially cylindrical inner peripheral surface receiving said insert; and
   said groove extends into the outer peripheral surface of said insert to provide a passageway for vapor formed of oil trapped in said cavity.

7. An electrode as defined in claim 6 wherein the outer peripheral surface of said insert has a surface-to-surface, telescoping fit with the inner peripheral surface of said insert bore.

8. An electrode as defined in claim 6 wherein said groove has a substantially triangular cross-sectional configuration.

9. An electrode as defined in claim 5 wherein:
said insert has a substantially cylindrical outer peripheral surface;
said insert bore has a substantially cylindrical inner peripheral surface receiving said insert; and
said groove extends into the inner peripheral surface of said electrode member to provide a passageway for vapor formed of cutting oil trapped in said cavity.

10. An electrode as defined in claim 9 wherein said groove has a substantially triangular cross-sectional configuration.

11. An electrode for a plasma torch, said electrode comprising an elongated electrode member having first and second opposite ends, said electrode member having an insert bore extending into the electrode member from the second end, said insert bore having a peripheral inner surface with a selected shape and a closed end, said bore further having a groove on the inner surface extending from the second end of the electrode member to the closed end of said insert bore.

12. An electrode as defined in claim 11 wherein said groove has substantially triangular, cross-sectional configuration.

13. An electrode as defined in claim 12 wherein said electrode member has a closed axial passage extending therein from the first end.

14. An insert for an electrode of a plasma torch comprising an elongated insert member having first and second opposite ends, said insert member having a cylindrical peripheral outer surface, said outer surface having a groove thereon extending between the first and second opposite ends, said groove being adapted for venting a cavity formed between the insert and an insert bore in the electrode when the insert is assembled therein.

15. An insert as defined in claim 14 wherein said groove has a substantially triangular cross-sectional configuration.

16. In an electrode adapted for a plasma torch including an elongated electrode member having an outer surface and first and second opposite ends, said electrode member having an insert bore being closed at one end and extending into the electrode member from said first end, said bore having a peripheral inner surface with a selected shape;
an insert having a peripheral outer surface matching said selected shape of said insert bore, said insert being received in said bore in telescoping relationship and spaced from the closed end of the bore to form a cavity therebetween, the improvement comprising:
means for venting said cavity through said outer surface of said electrode whereby gas producing substances trapped in said cavity cannot build up inert moving pressure.

17. In an electrode adapted for a plasma torch including an elongated electrode member having an outer surface and first and second opposite ends, said electrode member having an insert bore being closed at one end and extending into the electrode member from said first end, said bore having a peripheral inner surface with a selected shape;
an insert having a peripheral outer surface matching said selected shape of said insert bore, said insert being received in said bore in telescoping relationship and spaced from the closed end of the bore to form a cavity therebetween, the improvement comprising:
means for venting said cavity through said outer surface of said electrode whereby gas producing substances trapped in said cavity cannot build up inert moving pressure, said means for venting comprising a groove between said insert bore and said insert.

18. An electrode as defined in claim 17 wherein:
said insert has a substantially cylindrical, outer peripheral peripheral surface;
said insert bore has a substantially cylindrical inner peripheral surface receiving said insert; and
said groove extends into said outer peripheral surface of said insert to provide a passageway for vapor formed of oil trapped in said cavity.

19. An electrode as defined in claim 18 wherein the outer peripheral surface of the insert has a surface-to-surface fit with the inner peripheral surface of said insert bore.

20. An electrode as defined in claim 19 wherein said groove has a substantially triangular cross-sectional configuration.

21. An electrode as defined in claim 17 wherein:
said insert has a substantially cylindrical outer surface;
said insert bore has a substantially cylindrical inner surface receiving said insert; and
said groove extends into the inner peripheral surface of said electrode member to provide a passageway for vapor formed of cutting oil trapped in said cavity.

22. An electrode as defined in claim 21 wherein said groove has a substantially triangular cross-sectional configuration.

23. An electrode as defined in claim 17 wherein said insert is selected of a material having a higher coefficient of thermal expansion than the material forming the electrode member whereby said insert is received within said insert bore with a surface-to-surface fit at ambient temperature and with an interference fit when the electrode is at operating temperatures.

24. An electrode as defined in claim 23 wherein said electrode member is constructed of an electrically conductive material selected from the group comprising copper and copper alloys.

25. An electrode as defined in claim 24 wherein said insert is constructed of a metal being capable of withstanding high operating temperatures, said insert selected from the group comprising hafnium, zirconium, tungsten and alloys thereof.

* * * * *